May 29, 1934. T. J. KELLY 1,960,942
COOKING UTENSIL
Filed March 21, 1933 2 Sheets-Sheet 1

Inventor:
Thomas J. Kelly,
By Jas. C. Wobensmith
Attorney.

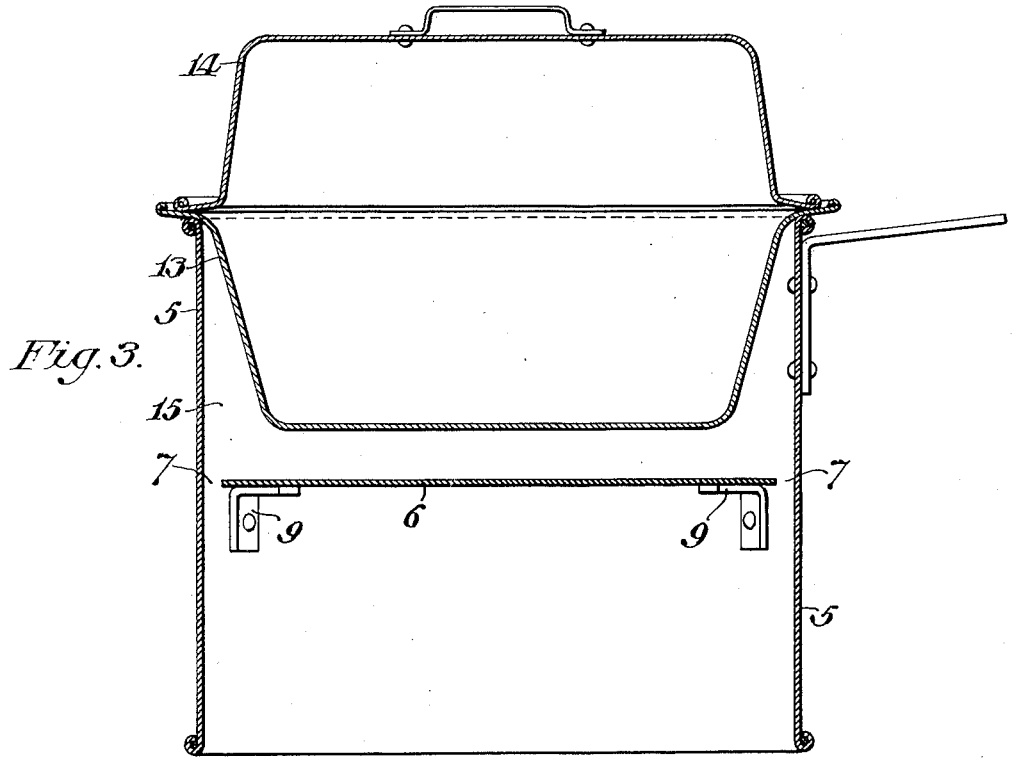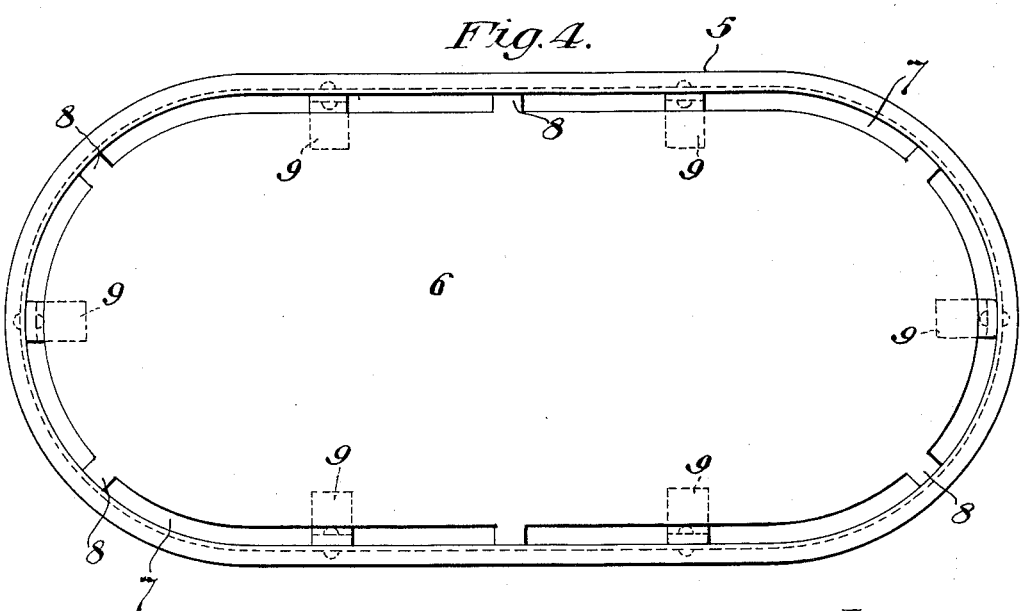

Patented May 29, 1934

1,960,942

UNITED STATES PATENT OFFICE 1,960,942

COOKING UTENSIL

Thomas J. Kelly, Philadelphia, Pa.

Application March 21, 1933, Serial No. 661,873

4 Claims. (Cl. 53—1)

My invention relates to cooking utensils, and it relates more particularly to a device which is adapted to be used on an ordinary gas range or the like, by means of which considerable economies in the consumption of fuel will be effected, and the articles of food will be cooked in a better and more satisfactory manner.

The principal object of my invention is to provide a device for cooking various articles of food, by means of which the heat will be conserved and applied more efficiently than where the food containers are placed directly over the open flame of the burner.

A further object of my invention is to provide a device of the character aforesaid, by means of which various cooking operations may be performed by varying the arrangement of the parts.

The device of my present invention will be found to be particularly adaptable for baking small batches of materials in pans, for baking such vegetables as potatoes directly in a portion thereof, and also for roasting.

The nature and characteristic features of my invention will be more readily understood from the following description, taken in connection with the accompanying drawings forming part hereof, in which:

Figure 1 is a vertical, central section of a cooking utensil embodying the main features of my present invention, the same being shown arranged for baking various articles of food in pans, dishes, or the like;

Fig. 3 is a view similar to Fig. 1, but with the device shown arranged for roasting;

Fig. 4 is a top or plan view similar to Fig. 2, but of a modified form of my invention, which is adapted to be mounted over a plurality of burners, for the purpose of roasting such articles as turkeys, large joints of meat, etc.

Figure 1:
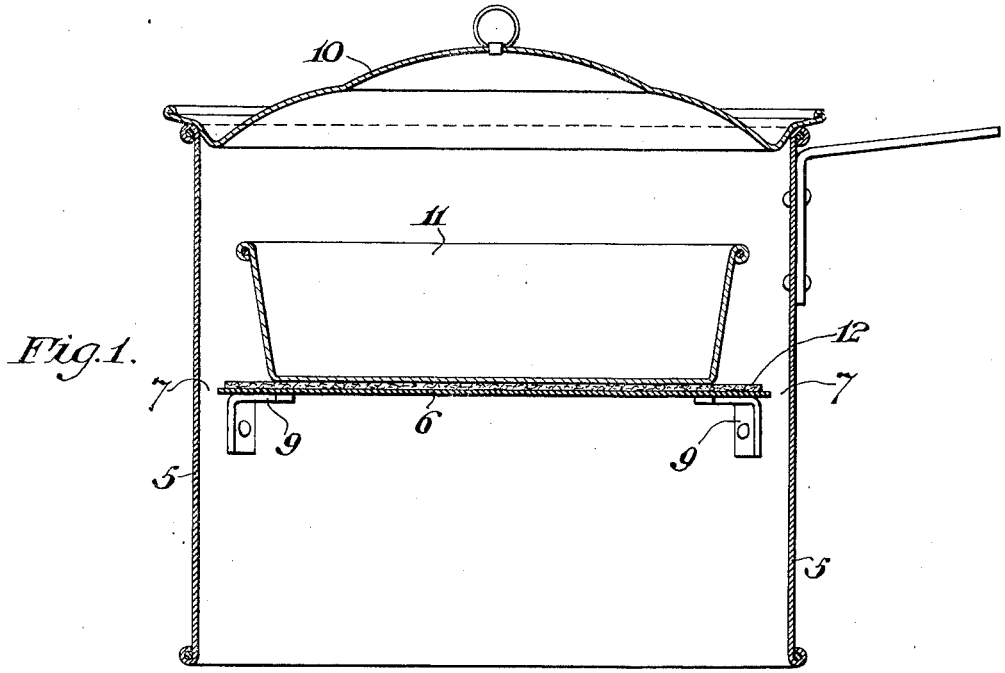

Referring to the drawings, in the particular embodiment of my invention therein shown, the main portion of the cooking utensil comprises an open ended metallic drum 5. The lower end of the drum 5 rests upon the gas range, directly over one of the burners thereof.

Disposed approximately midway between the top and bottom of the drum 5 is a horizontal plate 6, which is preferably of a smaller diameter than the interior of the drum, so as to provide an annular space 7 around the edge thereof, through which the products of combustion from the burner, in the form of hot gases, may pass to the upper portion of the device.

The plate 6 is imperforate, particularly at its central portion, and is provided with a plurality of projections 8, which serve to position the plate within the drum 5 and to maintain the space 7 uniform on all sides.

The plate 6 may be supported within the drum 5 in any suitable manner, but preferably is mounted upon a plurality of brackets 9 secured to the interior wall of the drum at proper locations. The plate 6 is preferably not secured to the brackets 9, in order that it may be removed for the purpose of cleansing.

The upper end of the drum 5 may be closed, as shown in Fig. 1 of the drawings, by means of a cover or lid 10 of ordinary type, the same, however, being of suitable shape to rest upon the top of the drum and be centered with respect thereto.

A baking pan or dish 11, containing articles of food which are to be baked, may be placed upon the plate member 6, but preferably an asbestos sheet 12 is interposed between the under side of the pan 11 and the top surface of the plate 6, which serves to prevent burning of the material in the bottom of the pan by the direct transmission of heat through the plate 6.

When the device is to be used for baking potatoes in their skins, and for carrying out similar cooking operations, the potatoes or other vegetable may be placed directly upon the asbestos sheet 12, or if preferred, they may be raised above the surface of the plate 6 by means of one of the wire forms (not shown) which are readily obtainable for such purpose.

When the device is to be used for roasting, the lid is discarded, and a roasting pan 13, preferably of the type having a deep cover 14, is placed in the top of the drum 5, the rim of the pan resting upon the top edge of the drum. The roasting pan 13 is preferably made with its side walls more or less tapering, in order to provide a space 15 between the drum and the exterior of the pan, so that the heat may be conveyed to the pan. Also the pan 13 is of such depth that the bottom thereof will be held some distance above the plate 6, so that the heat may be transmitted to the under side of said pan in the proper amount.

Figure 2:
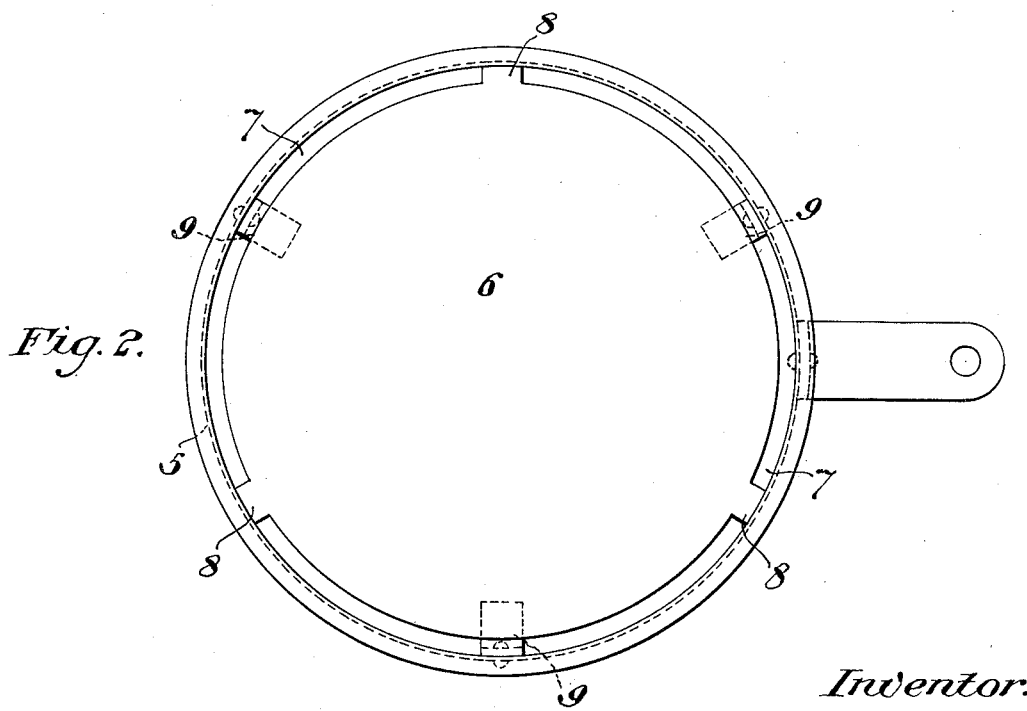
Fig. 2 is a top or plan view thereof, the lid and pan being removed.

The drum is preferably made in cylindrical form, as shown in Figs. 1 to 3 of the drawings, but where it is desired to provide for the cooking of objects such as turkeys, large joints of meat, etc., the arrangement shown in Fig. 4 of the drawings may be employed. In this arrangement, the drum, in plan, is approximately elliptical in form, and of such size as to permit the device to be placed over two burners of the gas range. The device shown in Fig. 4 of the drawings is in all other respects similar to that shown in Figs. 1 to 3.

In the use of the device of my invention, the heat will pass into the lower compartment of the drum 5, and thence through the space 7 into the upper compartment, and in this manner be applied evenly and steadily to all parts of the food being cooked. The plate 6 being disposed some distance above the burner, will preclude burning of the food by the direct application of the flame, and yet at the same time will permit heat to pass therethrough. It has been found in practice that the cooking can be effectively done with a much lower fuel consumption than is the case where the food containing pans are placed directly over the burner.

I claim:

1. A cooking utensil comprising an open ended drum adapted to be placed over a burner, a removable horizontal plate disposed therein between the top and bottom thereof, said plate being of a diameter less than that of the interior of the drum, spaced projections at the outer edge of the plate adapted to position the same diametrically thereby to provide a uniform annular circulating space between the edge of the plate and the wall of the drum for the passage of combustion products from the burner, and a closure for the top of the drum.

2. A cooking utensil comprising an open ended drum adapted to be placed over a burner, a removable horizontal plate disposed therein between the top and bottom thereof, said plate being of a diameter less than that of the interior of the drum thereby to provide an annular circulating space between the edge of the plate and the wall of the drum, means at the outer edge of the plate for spacing the plate diametrically with respect to the drum for the passage of combustion products from the burner, and brackets carried by the drum upon which the plate is supported.

3. A cooking utensil comprising an open ended drum adapted to be placed over a burner and having a removable horizontal plate disposed therein between the top and bottom thereof, said plate being of a diameter less than that of the interior of the drum, spaced projections at the outer edge of the plate adapted to position the same diametrically thereby to provide a uniform annular circulating space for combustion products from the burner between the edge of the plate and the wall of the drum, and brackets carried by the drum for supporting the plate.

4. A cooking utensil comprising an open ended drum adapted to be placed over a burner and having a horizontal plate disposed therein between the top and bottom thereof, said plate being shaped to provide a passage between the edge of the plate and the wall of the drum, and a closure for the top of the drum comprising a roasting pan so shaped with respect to the drum as to provide a space between the wall of the drum and the sides of the pan and of such depth as to provide a space between the bottom of the pan and the horizontal plate.

THOMAS J. KELLY.